(12) United States Patent
Anthony

(10) Patent No.: US 7,199,409 B2
(45) Date of Patent: Apr. 3, 2007

(54) DEVICE FOR SUBTRACTING OR ADDING CHARGE IN A CHARGE-COUPLED DEVICE

(75) Inventor: Michael P. Anthony, Andover, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 281 days.

(21) Appl. No.: 10/926,937

(22) Filed: Aug. 26, 2004

(65) Prior Publication Data

US 2006/0043441 A1    Mar. 2, 2006

(51) Int. Cl.
| | |
|---|---|
| H01L 27/148 | (2006.01) |
| H01L 29/747 | (2006.01) |
| H01L 29/768 | (2006.01) |
| H01L 29/745 | (2006.01) |
| H01L 29/76 | (2006.01) |

(52) U.S. Cl. .................. 257/215; 257/214; 257/225; 257/226; 257/235; 257/236; 257/238; 257/241; 257/242; 257/250; 257/905

(58) Field of Classification Search ........ 257/214–215, 257/225–226, 235–236, 238, 241–242, 250, 257/905

See application file for complete search history.

(56) References Cited

U.S. PATENT DOCUMENTS

| | | | |
|---|---|---|---|
| 3,660,697 A * | 5/1972 | Berglund et al. ........... 327/565 |
| 3,829,885 A * | 8/1974 | Nishizawa et al. ......... 257/215 |
| 3,969,634 A | 7/1976 | Su et al. | |
| 4,035,667 A | 7/1977 | Heller | |
| 4,093,872 A * | 6/1978 | Hartman et al. ............. 377/57 |
| 4,104,543 A | 8/1978 | Maeding | |
| 4,210,825 A | 7/1980 | Crochiere et al. ........... 377/61 |
| 4,239,983 A | 12/1980 | Edwards et al. ............. 377/49 |
| 4,246,496 A | 1/1981 | Heller | |
| 4,489,309 A | 12/1984 | Schlig | |
| 4,554,571 A * | 11/1985 | Arques ....................... 257/226 |
| 4,573,177 A | 2/1986 | Petrosky | |
| 4,639,678 A | 1/1987 | Schlig et al. | |
| 4,649,554 A | 3/1987 | Boudewijns et al. | |
| 4,686,648 A | 8/1987 | Fossum | |
| 4,803,706 A * | 2/1989 | Murayama et al. .......... 377/63 |
| 5,371,392 A * | 12/1994 | Isono et al. ................. 257/236 |
| 5,579,007 A | 11/1996 | Paul ............................ 341/172 |

(Continued)

OTHER PUBLICATIONS

Fossum, Eric R., et al., "A Linear and Compact Charge-Coupled Charge Packet Differencer/Replicator", IEEE Transaction on Electron Devices, Dec. 1984, vol. ED-31, No. 12, 6 pages.

(Continued)

*Primary Examiner*—Ida M. Soward
(74) *Attorney, Agent, or Firm*—Daly, Crowley, Mofford & Durkee, LLP

(57) ABSTRACT

The present invention provides an apparatus for adding or subtracting an amount charge to or from a charge packet in a CCD as the packet traverses the CCD. The apparatus uses a "wire transfer" device structure to perform the addition or subtraction of charge during the charge packets traversal across the device. A pair of electrically interconnected diffusions are incorporated within the charge couple path to provide an amount of charge which can be added or subtracted from packets as the packets traverse the CCD.

37 Claims, 8 Drawing Sheets

U.S. PATENT DOCUMENTS

| | | | |
|---|---|---|---|
| 5,736,757 A | 4/1998 | Paul | 257/236 |
| 6,927,442 B2* | 8/2005 | Kaneko et al. | 257/299 |
| 2002/0105021 A1* | 8/2002 | Myono et al. | 257/299 |

OTHER PUBLICATIONS

Fossum, Eric R., "Wire Transfer of Charge Packets for On-Chip CCD Signal Processing", SPIE, vol. 1242, Jul. 1990, pp. 179-186.

Colbeth, Richard E., et al., "A 1-GHz Charge-Packet Replicator/Subtractor Circuit GaAs CCD Signal Processing", IEEE Journal of Solid-State Circuits, vol. 25, No. 4, Aug. 1990, pp. 1016-1019.

Fossum, Eric R., "Wire Transfer of Charge Packets Using a CCD-BBD Structure for Charge-Domain Signal Processing", IEEE Transactions on Electron Devices, vol. 38, No. 2, Feb. 1991, pp. 291-298.

Paul, Susanne A., et al., "A Nyquist-Rate Pipelined Oversampling A/D Converter", IEEE Journal of Solid State Circuits, vol. 34, No. 12, Dec. 1999, pp. 1777-1787.

Sheppard, Scott T., "Charge Coupled Devices", website http://www.ecn.purdue.edu/WBG/Device_Research/CCDs/Index.html, Oct. 26, 2001.

* cited by examiner

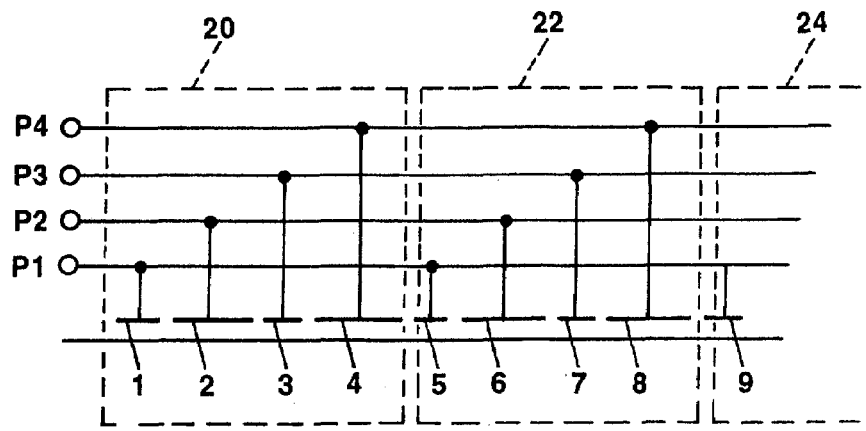
Figure 1
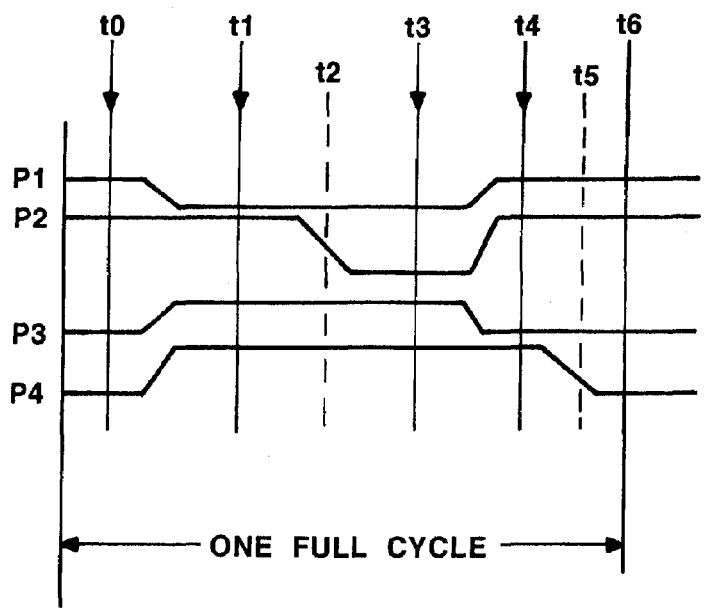
Figure 3A
Figure 3B
Figure 3C
Figure 3D

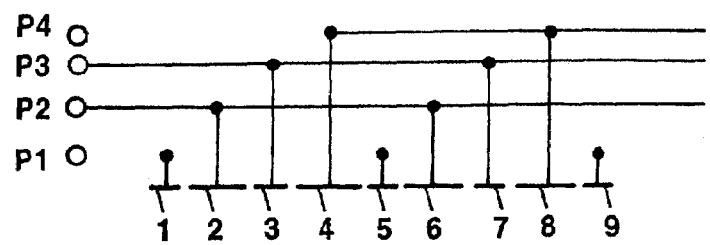
Figure 2
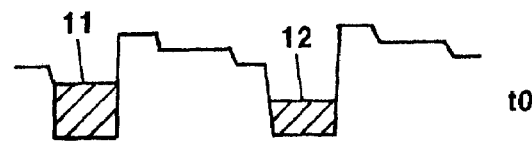
Figure 2A  t0
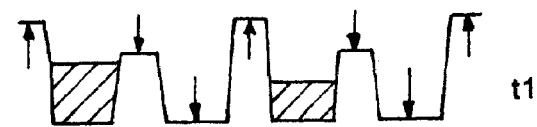
Figure 2B  t1
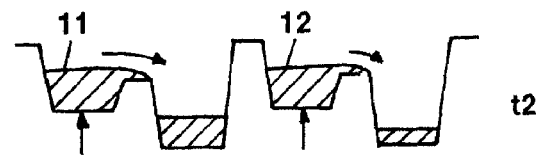
Figure 2C  t2
Figure 2D  t3
Figure 2E  t4
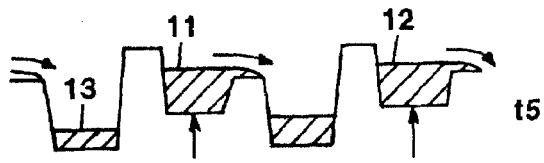
Figure 2F  t5
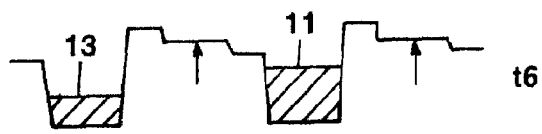
Figure 2G  t6

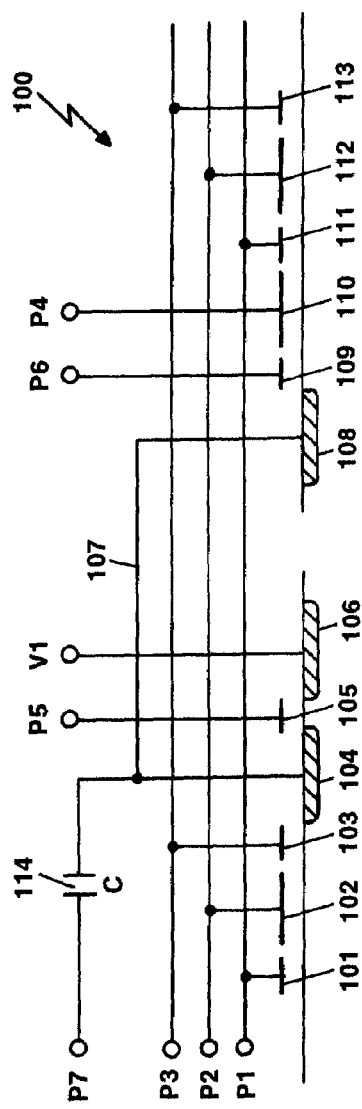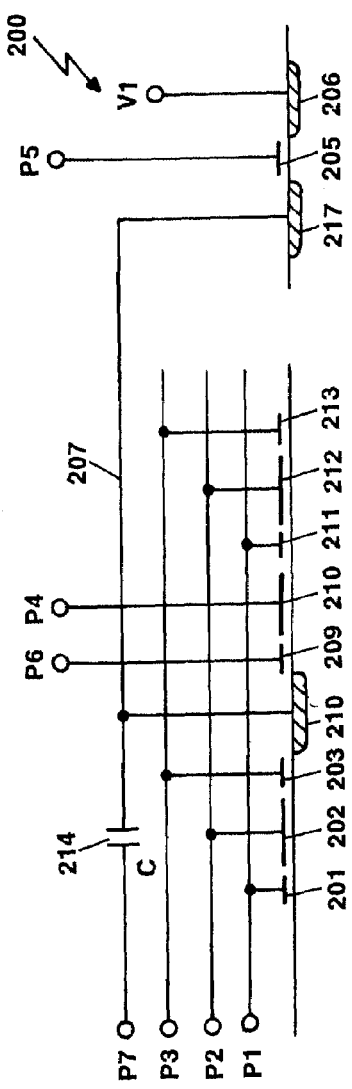
*Figure 4*
*Figure 7*

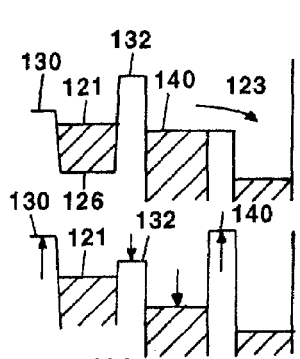
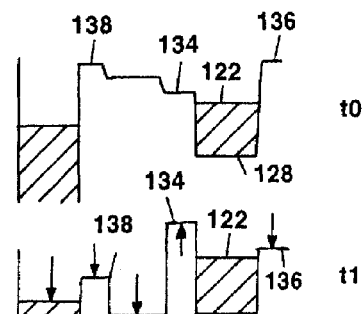
Figure 5A
Figure 5B
Figure 5C
Figure 5D
Figure 5E
Figure 5F
Figure 5G Figure 6A  P1 
Figure 6B  P2 
Figure6C  P3 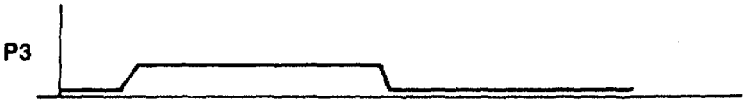
Figure 6D  P4 
Figure 6E  P5 
Figure 6F  P6 
Figure 6G  P7 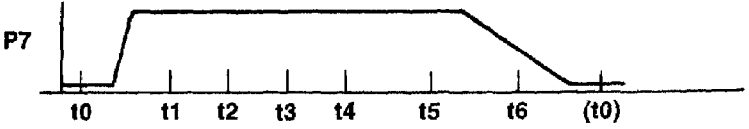

Figure 8A 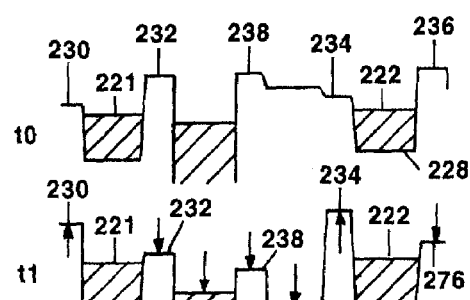 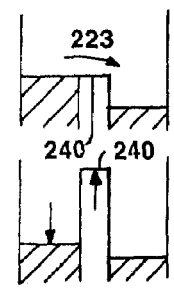

Figure 8C 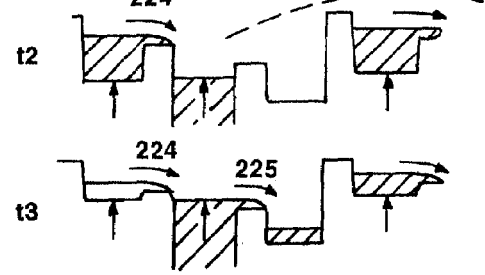 
Figure 8D 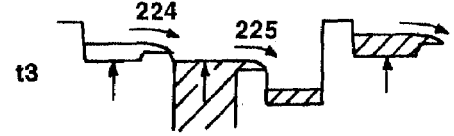 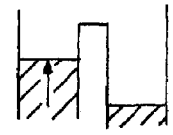
Figure 8E 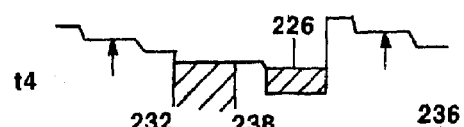 
Figure 8F 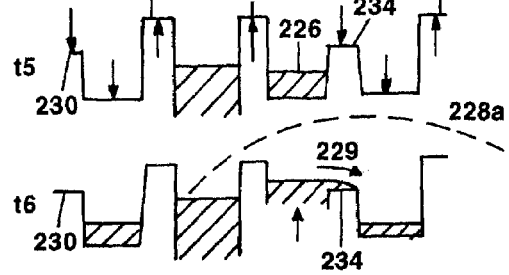 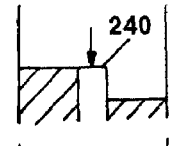
Figure 8G  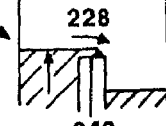

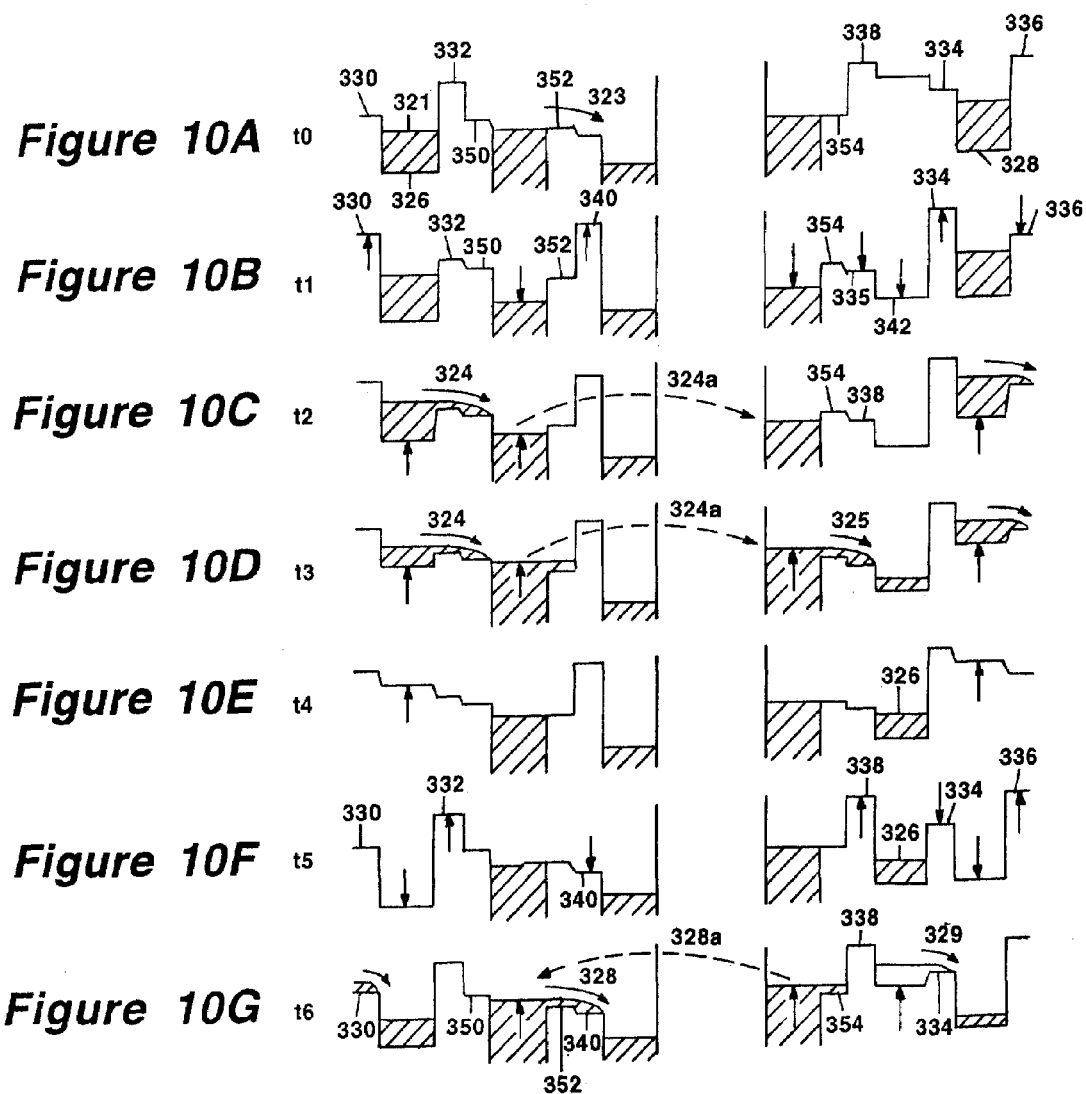

DEVICE FOR SUBTRACTING OR ADDING CHARGE IN A CHARGE-COUPLED DEVICE

CROSS REFERENCE TO RELATED APPLICATIONS

This invention was made with government support under Contract No. F19628-00-C-0002 awarded by the Air Force. The government has certain rights in the invention.

STATEMENT REGARDING FEDERALLY SPONSORED RESEARCH

Not Applicable.

FIELD OF THE INVENTION

The present invention relates generally to Charge Coupled Devices (CCDs) and in particular to an apparatus for subtracting or adding charge to charge packets in a CCD.

BACKGROUND OF THE INVENTION

Charge-Coupled Devices (CCDs) provide a basic function of storing and moving isolated packets of charge. Various operations can be performed on the packets: they can be added (merged), split into two or more pieces, conditionally steered, destructively or non-destructively sensed, etc. These operations make it possible to design CCD-based circuits to perform various discrete-time analog signal processing operations, with signals represented as charge packets or differential charge-packet pairs.

One operation that has proved difficult to implement, however, is subtraction. Various methods have been proposed for subtracting one charge packet from another, or removing a fixed or controllable charge from a packet. All of these methods suffer from various accuracy problems such as non-linearity and noise, or from slow operating speed.

SUMMARY OF THE INVENTION

The present invention provides a method and apparatus for adding charge to or subtracting charge from a charge packet in a Charge-Coupled Device (CCD). The method and apparatus utilize a CCD structure which includes elements to perform the addition or subtraction of charge during the charge packet's traversal across the device. The amount of charge to be added or subtracted is controlled by a voltage extrinsic to the CCD itself and is coupled into a CCD charge stream by a capacitor which in one embodiment is separate from the CCD.

The disclosed method has several advantages over the prior art: (1) it is very linear with respect to the subtracted or added value; (2) it can be made very linear with respect to the starting charge packet (from which subtraction occurs); (3) it operates at the same speed as the CCD in which it is embedded; (4) it introduces relatively little noise, and (5) it can transfer charge from one CCD segment to a non-adjacent CCD segment during the subtraction/addition process.

BRIEF DESCRIPTION OF THE DRAWINGS

The invention will be more fully understood from the following detailed description taken in conjunction with the accompanying drawings, in which:

FIG. 1 is a schematic diagram of a prior-art charge coupled device (CCD);

FIG. 2 is a schematic of a CCD;

FIGS. 2A–2G are a series of diagrams which illustrate the potentials and charge packets under various gates at different times during operation of a CCD of the type shown in FIG. 1;

FIGS. 3A–3D are a series of timing diagrams which illustrate how four control signals (clock voltages) vary with time over one full clock cycle to produce the CCD operation shown in FIG. 2;

FIG. 4 is a schematic diagram of a CCD;

FIGS. 5A–5G illustrate the potentials and charge packets under various gates of the CCD shown in FIG. 4 at different times during a charge-subtraction operation;

FIGS. 6A–6G are a series of timing diagrams which illustrate control (clock voltage) signals used to produce the CCD charge-subtraction operation shown in FIG. 5;

FIG. 7 is a schematic diagram of a CCD;

FIGS. 8A–8G illustrate the potentials and charge packets under various gates of the CCD shown in FIG. 7 at different times during a charge-subtraction operation;

FIGS. 10A–10G illustrate the potentials and charge packets under various gates of the charge subtraction device shown in FIG. 9 at different times during a charge-subtraction operation.

DETAILED DESCRIPTION OF THE INVENTION

Figure 8B:

Charge Coupled Devices (CCDs) are well-known devices with a wide variety of scientific and commercial applications, such as image sensors in digital still cameras and video cameras. CCDs comprise linear shift registers formed by a series of Metal-Oxide-Semiconductor (MOS) gates resident on the surface of a semiconductor substrate. Clock voltages applied to the gates result in the formation of localized potential wells and barriers in the semiconductor substrate under the gates. Charge packets are confined in these potential wells by the potential barriers and are shifted along the surface of the substrate under the influence of appropriate clock voltage waveforms applied to the gates. Thus CCDs fundamentally provide the functions of storage and shifting of signals represented as charge packets.

Basic operation of a conventional CCD is explained with reference to FIGS. 1, 2, and 3. In this discussion, a device of the type sometimes referred to as a "four-phase" CCD is used to illustrate device structures and operation. In this CCD type, each stage of the CCD has four gates, two used to create storage wells and two used to create barriers. Other CCD types, such as two-phase and three-phase, are also common. The four-phase type illustrated is convenient for explaining basic CCD operation as well as the operation of the present invention. The present invention is, however, applicable to any of these other types as well. Throughout this discussion it is further assumed that the charge packets being processed are made up of electrons. Hole-based CCDs are also possible, although unusual in practice.

Referring now to FIG. 1, a schematic representation of part of a prior art CCD is shown for explanation purposes only. In this example, a total of nine gates are shown, comprising two complete four-phase CCD stages plus one additional gate. Storage gates 2, 4, 6 and 8 are represented as long heavy horizontal lines; barrier gates 1, 3, 5, 7 and 9 are represented as shorter heavy horizontal lines. Gates 1, 2, 3 and 4 comprise the first CCD stage 20; gates 5, 6, 7 and 8 comprise the second stage 22; and gate 9 is the first barrier gate of a third stage 24. Additional CCD stages are assumed to extend to the right and left of the stages shown. Each of the four gates comprising one stage of the device is connected to a separate clock voltage, identified as P1, P2, P3 and P4. The same four clocks are re-used in each stage.

FIG. 3 is a timing diagram showing how the four clock voltages P1 through P4 vary with time over one full clock cycle. Seven instants t0 through t6 are identified. Time t6 is the beginning of the next clock cycle, equivalent to time t0. These seven times are discussed in detail with reference to FIGS. 5A–5G.

Referring now to FIG. 2, the schematic CCD representation from FIG. 1 is repeated at the top for reference. The seven diagrams below this schematic represent potentials and charge quantities under each gate at seven successive instants during the operating cycle of the device. In these diagrams the potential and charge-quantity representation is of a type common in CCD literature. A low potential indicates a region attractive to charge (a "well"), and a high potential indicates a region that repels or excludes charge (a "barrier"). When two adjacent regions have differing potentials, any charge present flows to the region of lowest available potential. Because the charge packets consist of electrons, which are negatively charged, a higher (more positive) gate voltage produces a lower (more attractive) potential, and a lower gate voltage produces a higher (more repulsive) potential. The presence of charge under a gate raises the potential there (because it tends to repel similar charge). This effect is shown as shading in the diagrams; lack of shading indicates absence of charge. Vertical arrows in each diagram indicate changes of potential from the previous diagram. Horizontal arrows indicate charge movement.

The seven instants illustrated in FIG. 2 are identified as t0, t1 . . . t6. As will be seen, the overall effect of one full cycle of operation of the illustrated device is to shift a charge packet from one stage to the next stage of the CCD. The process of moving or coupling the charge from one gate to the next gives rise to the name "charge-coupled device".

Initially, at time t0, clock voltage P2 is high, forming wells under storage gates 2 and 6, while clock voltages P1, P3, and P4 are low, forming barriers under barrier gates 1, 3, 5, 7 and 9 and making storage gates 4 and 8 unattractive to charge. Charge packets 11 and 12 are held in the wells under storage gates 2 and 6 respectively, and prevented from moving by the barriers under gates 1 and 3, and 5 and 7 respectively.

At time t1, clock voltage P1 is made lower, raising the barriers under gates 1, 5, and 9. At approximately the same time, clock voltage P3 is made somewhat higher, lowering the barriers under gates 3 and 7. These barriers are still high enough, however, to continue the confinement of charge packets 11 and 12 under gates 2 and 6. Also at approximately the same time, clock voltage P4 is made high, so that wells form under storage gates 4 and 8. No charge is yet able to flow into these wells, however. Changes in potential from time t0 are indicated by arrows.

At time t2, clock voltage P2 is lowered, thus raising the potentials under gates 2 and 6, and consequently the potentials of charge packets 11 and 12. When the potentials of these charge packets become high enough, the charge is able to flow over the lowered barriers under gates 3 and 7, into the wells under storage gates 4 and 8 respectively. The higher barriers under gates 1 and 5 prevent charge flow in the reverse direction. Arrows in the figure indicate the direction of charge flow.

At time t3, clock voltage P2 has reached its minimum value, and the flow of charge ceases, with packets 11 and 12 fully transferred to gates 4 and 8. Note that the potentials and charges at this stage are similar to those at t0, except that the pattern is shifted two gates to the right. Thus a charge transfer by one-half of a full (four-gate) CCD stage has occurred.

At time t4, clock voltage P3 is made lower, raising the barriers under gates 3 and 7. At approximately the same time, clock voltage P1 is made somewhat higher, lowering the barriers under gates 1, 5 and 9. These barriers are still high enough, however, to continue the confinement of charge packets 111 and 12 under gates 4 and 8. Also at approximately the same time, clock voltage P2 is made high, so that wells form under storage gates 2 and 6. No charge is yet able to flow into these wells.

At time t5, clock voltage P4 is lowered, thus raising the potentials under gates 4 and 8, and consequently the potentials of charge packets 11 and 12. When the potentials of these charge packets become high enough the charge is able to flow over the lowered barriers under gates 5 and 9. Charge packet 11 flows into the well under gate 6; charge packet 12 flows out of the figure, into the first storage well of the next stage. At the same time, a new charge packet, 13, flows from the previous stage (not shown) into the well under gate 2. The higher barriers under gates 3 and 7 prevent charge flow in the reverse direction.

At time t6, clock voltage P4 has reached its minimum value, and the flow of charge ceases, with packets 11, 12 and 13 fully transferred. Note that the potentials at this time are identical to those at t0. The charge packets, however, have been shifted four gates to the right. Thus a charge transfer by one full CCD stage has occurred. t6 is cyclically equivalent to t0; further charge transfers occur as this cycle repeats. All the charge packets move across the device simultaneously. At all times a well containing a charge is bounded by barriers at each side in order to properly store the charge and maintain the integrity of the charge. While a right shifting operation has been described, the charges can be moved in a left shifting operation as well, simply by interchanging the timing of barrier clock voltages P1 and P3.

Basic operation of a prior-art four-phase CCD shift register has been explained thus far, with the aid of FIGS. 1, 2, and 3. In certain instances it may be desirable to subtract or add an amount of charge to a charge packet being transported in a CCD. The present invention provides this additional capability. The operation of charge subtraction is explained with reference to FIGS. 4, 5, and 6.

Referring now to FIG. 4, a charge-subtraction device 100 includes barrier gates 101, 103, 105, 109, 111 and 113; storage gates 102, 110 and 112; and diffused regions 104, 106 and 108. The drawing conventions used in FIG. 4 are the same as those used in FIG. 1, with three additional features: diffused regions 104, 106, and 108; a capacitor 114 (not part of the CCD itself); and a path 107 coupling diffused regions 104 and 108. Path 107 may be comprised of metal or other material capable of providing an ohmic contact between the two diffused regions 104 and 108. It is sometime referred to in the following text as a "wire."

Diffused regions 104, 106, and 108 are regions of opposite conductivity type to the device substrate, similar to the source/drain diffusions of ordinary MOSFETs. They are referred to hereafter as "diffusions." A diffusion can be regarded as a source or sink for charge, having essentially unlimited quantities of charge carriers available. The potential of charge in the diffusion is related to the electrical voltage of an electrode connected to the diffusion, and may be set by external connection or by charge flows within a CCD. With electrons as charge carriers, a more positive electrode voltage corresponds to a more negative diffusion potential. Note that because of the connection through wire 107, the potential of diffusions 104 and 108 are always equal. Any tendency towards imbalance is corrected by current flow through wire 107.

Gates 101, 102, 103, and 110 comprise the four gates of an ordinary four-phase CCD stage, as described with reference to FIG. 1; these gates are driven by clock voltages P1, P2, P3, and P4 respectively. Note, however, that whereas in a conventional CCD gates 103 and 110 would be adjacent, in the present circuit there are additional structures disposed between them. Gates 111, 112, and 113 constitute the first three gates of an ordinary CCD stage (which continues to the right of the diagram), with the same clock voltages as gates 101, 102, and 103. Additional CCD stages are assumed to continue to the right and left of the region illustrated in FIG. 4. Barrier gate 105 is clocked by voltage P5, and barrier gate 109 is clocked by voltage P6. Capacitor 114 is driven by clock voltage P7. These three clock voltages differ from the basic CCD clock voltages shown in FIGS. 1, 2, and 3, and will be described in detail below. Diffusion 106 is connected to a DC bias voltage V1.

In a CCD, charge flow is between adjacent gates, so the elements of a CCD must occupy contiguous portions of the semiconductor substrate. In contrast, the device shown has two sections (on the left, from gate 101 through diffusion 106; and on the right, from diffusion 108 through gate 113) which can be located on separate areas of the substrate. These sections are separable because charge flow between them occurs by ordinary conduction via wire 107, rather than by CCD-type charge transfer.

FIGS. 6A–6G are timing diagrams showing how the seven clock signals P1 through P7 (e.g. clock voltage) vary with time over one full clock cycle. The clock signals P1, P2, P3 and P4 are as shown in FIG. 3. Clock signal P7 is similar in timing to signal P4, but with different maximum and minimum values (e.g. different maximum and minimum voltage values). Likewise, signals P5 and P6 are similar in timing to signals P1 and P3 respectively, but with different maximum and minimum values. Seven instants of time designated as t0 through t6, are identified. An eighth instant of time, identified as (t0), is the beginning of the next clock cycle, equivalent to time t0 at the left of the figure. These seven times are discussed in detail with reference to FIGS. 5A–5G.

Referring now to FIGS. 5A–5G, potentials and charge quantities under each gate shown in FIG. 4 and potentials of the three diffusions, at the seven successive instants identified in FIGS. 6A–6G are shown. The drawing conventions used in this figure are the same as conventions used in FIG. 2. As will be seen, the overall effect of one full cycle of operation of the device 100 (FIG. 4) is to shift a charge packet from left to right in the figure (starting at gate 102 and ending at gate 112) while subtracting a defined quantity of charge from it.

Referring first to FIG. 5A, initially, at time t0, clock voltage P2 (FIG. 6B) is high, forming potential wells 126, 128 under gates 102 and 112 respectively. Clock voltages P1 (FIG. 6A) and P3 (FIG. 6C) are low, forming barriers 130, 132, 134, 136 under gates 101, 103, 111, and 113 respectively. Clock voltage P1 is slightly higher than P2, so the barriers 130, 134 under gates 101 and 111 are slightly lower than barriers 132, 136 under gates 103 and 113. Clock voltage P6 (FIG. 6G) is low, forming a barrier 138 under gate 109. Clock voltage P4 (FIG. 6D) is low, making storage gate 110 unattractive to charge. Charge packets 121 and 122 are held in potential wells 126 and 128 under storage gates 102 and 112 respectively, isolated by the barriers 130, 132, 134, 136 under gates 101, 103, 111, and 113. Packet 121 is an input charge to the device, and packet 122 is an output charge (from the previous subtraction operation). Clock voltage P5 (FIG. 6E) is moderately high, forming a low barrier 140 under gate 105. Clock voltage P6 (FIG. 6F) is low, forming a barrier under gate 109.

The potential of diffusions 104 and 108 has been established by allowing charge from diffusion 104 to flow over barrier 140 under gate 105 to diffusion 106, which acts as a drain. This flow is identified as current 123. Because of their connection via wire 107, diffusions 104 and 108 are at the same potential. At time t0, current flow 123 has declined to a negligible value, and the potential of diffusions 104 and 108 has settled to equilibrium with the potential of barrier 140 under gate 105, which is set by clock voltage P5.

Referring now to FIG. 5B, at time t1 clock voltage P2 is lowered, making the barriers 130, 134 at gates 101 and 111 higher, and clock voltage P3 is raised, making the barriers 132, 136 at gates 103 and 113 somewhat lower. All four barrier potentials remain high enough to confine charge packets 121 and 122 in their respective wells. Clock voltage P5 is lowered, raising the potential of barrier 140 under gate 105, thus preventing further charge flow from diffusion 104 to diffusion 106. Clock voltage P4 is made high, forming a potential well 142 under gate 110. Clock voltage P7 is raised by an amount $\Delta V7$; this voltage change is coupled via capacitor 114 and wire 107 to diffusions 104 and 108, causing their potentials to be lowered. Clock voltage P6 is raised to the level which P5 had at t0, lowering barrier 138 under gate 109 to the same potential that barrier 140 under gate 105 had at t0. A path now exists for charge to flow from diffusion 108 over barrier 138 to well 142 under gate 110, but the reduced diffusion potential due to the change in P7 prevents such flow.

Referring now to FIG. 5C, at time t2 clock voltage P2 is ramped to a lower voltage. This action raises the well potential under gates 102 and 112, and consequently the potential of charge packets 121 and 122, allowing them to flow over the barriers 132, 136 at gates 103 and 113 respectively. Charge packet 122 flows into the next storage gate (not shown) as in the basic CCD description given previously. Charge packet 121 flows onto diffusion 104 (as current 124), raising the potential of diffusion 104. Some of this current, identified as 124a, flows via wire 107 from diffusion 104 to diffusion 108, maintaining the equal potential of diffusions 104 and 108. At time t2, the potential of diffusions 104 and 108 has not yet risen enough to allow charge to flow over the barrier 138 at gate 109.

Referring now to FIG. 5D, at time t3 clock voltage P2 continues its negative ramp, causing the well potentials under gates 102 and 112 to continue to rise. Charge continues to flow over the barrier 132 at gate 103 (as current 124) and over the barrier 136 at gate 113. Due to charge added by current 124, the potential of diffusions 104 and 108 has risen high enough for charge to flow over the barrier 138 at gate 109, resulting in current 125. As at time t2, charge added to diffusion 104 by current 124 is conveyed to diffusion 108 by wire 107.

Referring now to FIG. 5E, at time t4 the negative ramp of clock voltage P2 which began at time t2 is complete. In this state, the potential under gates 102 and 112 is sufficiently high that all charge from these gates has flowed over the adjacent barriers 132, 136 (at gates 103 and 113 respectively). Charge packet 122 is held by the next storage well to the right of gate 113, which is not shown. Charge packet 121 has been fully transferred to diffusion 104. Part of it has continued on via wire 107 to diffusion 108, and part of that component has flowed (as current 125, shown at t3) over barrier 138 under gate 109 to the well under gate 110. The resulting charge packet at gate 110 is identified as 126. At t4, currents 124, 124a, and 125 have all declined to a negligible value.

As mentioned in connection with the discussion of the circuit at time t1, the potential under gate 109 is equal to the potential which existed under gate 105 at t0; this potential served to establish the potential of diffusions 104 and 108 at t0. Thus, at equilibrium, the potential of these diffusions and the voltage of wire 107 must be the same as they were at t0. For this to be true, capacitor 114 must have been charged by an amount $\Delta Q = C \cdot \Delta V7$. This is the amount of charge subtracted in this operation. The charge packet 126 resulting under gate 110 is reduced in size from the original packet 121 by this amount $\Delta Q$.

Referring now to FIG. 5F, at time t5 clock voltage P3 is set low and P1 is raised somewhat. As a result, barriers 130, 132, 134 and 136 under gates 101, 103, 111 and 113 respectively remain (with barriers 130 and 134 slightly lower.) Clock voltage P2 is set high, forming (empty) wells under gates 102 and 112. Clock voltage P6 is set low, raising the potential of barrier 138 under gate 109. Clock voltage P5 is raised, lowering the potential of barrier 140 under gate 105 to its original value at t0. No current flows from diffusion 104 because it is already at equilibrium with this potential.

Referring now to FIG. 5G, at time t6, clock voltages P4 and P7 are ramped negative. The negative ramp of P4 results in positive ramps in potentials under gate 110 and the gate preceding gate 101 (not shown). This potential rise allows charge packet 126 to flow from gate 110 over the barrier 134 under gate 111 into the well under gate 112. This flow is identified as current 129. Charge from the CCD well to the left of gate 101 flows over the barrier 130 at gate 101 into the well under gate 102 as current 127. Current flows 127 and 129 constitute normal CCD-type charge transfers, as described in conjunction with FIG. 2.

Also at time t6, clock voltage P7 is ramped negative. This negative ramp causes a negative change in the voltage of wire 107, with a corresponding positive ramp in the potential of diffusions 104 and 108. This potential rise allows charge to flow as current 128 from diffusion 104, over the barrier 140 at gate 105, to the drain diffusion 106. In order to maintain diffusion 108 at the same potential as diffusion 104, current 128a also flows via wire 107 from diffusion 108 to diffusion 104. Currents 128 and 128a constitute the disposal of the charge $\Delta Q$ which was earlier subtracted from charge packet 121 (resulting in packet 126).

At the conclusion of the voltage ramps described at t6, all voltages have returned exactly to the state shown at t0. Charge packet 126 now resides in the potential well under gate 112 (where packet 122 was located at t0). Thus, the overall effects of the device's operation through a full cycle are, first, to shift a charge packet from gate 102 to gate 112, and, second, to subtract an amount of charge $\Delta Q = C \cdot \Delta V7$ from it. In successive operating cycles, each charge packet passing through the device is similarly processed.

The device depicted in FIG. 4 can also be used to add charge to a charge packet rather than subtracting it. The sequence of operations is similar to that shown in FIG. 5, except that the sign of $\Delta V_7$ is reversed, and charge is supplied rather than drained via diffusion 106.

Referring now to FIG. 7, another embodiment of a charge subtraction device 200 includes barrier gates 201, 203, 205, 209, 211 and 213; storage gates 202, 210 and 212; and diffused regions 216, 217 and 206. Diffused regions 216, 217 are coupled via path 207. Path 207 may be comprised of metal or other material which makes ohmic contact to the two diffused regions. This embodiment comprises a rearrangement of the same elements of the device described above in conjunction with FIG. 4. For example gate 201 in FIG. 7 corresponds to gate 101 in FIG. 4, etc. The combined functions of diffusions 104 and 108 in FIG. 4 are here carried out by diffusions 216 and 217. The arrangement of FIG. 7 is useful if the charge-subtraction operation is desired in the middle of an on-going CCD register, rather than with the output portion of the device in a separate substrate area as shown in FIG. 4.

In this embodiment, as in the embodiment shown in FIGS. 4 and 5–5G, the incoming charge is transferred from a well under gate 202, over a barrier under gate 203, onto a diffusion (216 in this case); and thence (after charge subtraction) over a barrier under gate 209 to a well under gate 210. Unlike the embodiment shown in FIG. 4, however, gate 209 is adjacent diffusion 216, so the diminished charge packet continues along a contiguous path rather than being transferred to a remote location via wire 107. The subtracted charge is disposed of by flow from diffusion 217 to diffusion 206 over a barrier under gate 205. This arrangement does not materially change the function of the device from that of the embodiment described above in conjunction with FIGS. 4 and 5–5G.

The clock voltages and bias voltage required to operate charge subtraction device 200 shown in FIG. 7 are identical to those shown in FIG. 6.

Referring now to FIGS. 8–8G, potentials and charge quantities under each gate shown in the device 200 of FIG. 7 and potentials of the three diffusions, at the seven successive instants of time t0–t6 identified in FIGS. 6A–6G are shown. The drawing conventions used in this figure are the same as conventions used in FIG. 2. As will be seen, the overall effect of one full cycle of operation of the device 200 (FIG. 7) is to shift a charge packet from left to right in the figure (starting at gate 202 and ending at gate 212) while subtracting a defined quantity of charge from it.

Referring first to FIG. 8A, initially, at time t0, clock voltage applied to terminal P2 (FIG. 7) is high, forming potential wells 221, 228 under gates 202 (FIG. 7) and 212 (FIG. 7) respectively. The clock voltages applied to terminals P1 (FIG. 7) and P3 (FIG. 7) of the device 200 are low, forming barriers 230, 232, 234, 236 under gates 201, 203, 211, and 213 (FIG. 7) respectively. The clock voltage applied to terminal P1 is slightly higher than the voltage applied to terminal P2, so the barriers 230, 234 under gates 201 and 211 are slightly lower than barriers 232, 236 under gates 203 and 213. The clock voltage applied to terminal P6 (FIG. 7) is low, forming a barrier 238 under gate 209 (FIG. 7). The clock voltage applied to terminal P4 (FIG. 7) is low, making storage gate 210 unattractive to charge. Charge packets 221 and 222 are held in potential wells 226 and 228 under storage gates 202 and 212 respectively, isolated by the barriers 230, 232, 234, 236 under gates 201, 203, 211, and 213. Packet 221 is an input charge to the device, and packet 222 is an output charge (from the previous subtraction operation). The clock voltage applied to terminal P5 (FIG. 7) is moderately high, forming a low barrier 240 under gate 205

(FIG. 7). The clock voltage applied to terminal P6 is low, forming a barrier under gate 209 (FIG. 7).

The potential of diffusions 216 (FIG. 7) and 217 (FIG. 7) has been established by allowing charge from diffusion 216 to flow over barrier 240 under gate 205 to diffusion 206 (FIG. 7), which acts as a drain. This flow is identified as current 223. Because of their connection via wire 207, diffusions 216 and 217 are at the same potential. At time t0, current flow 223 has declined to a negligible value, and the potential of diffusions 216 and 217 has settled to equilibrium with the potential of barrier 240 under gate 205, which is set by the clock voltage provided to terminal P5.

Referring now to FIG. 8B, at time t1 clock voltage P2 is lowered, making the barriers 230, 234 at gates 201 and 211 higher, and clock voltage P3 is raised, making the barriers 232, 236 at gates 203 and 213 somewhat lower. All four barrier potentials remain high enough to confine charge packets 221 and 222 in their respective wells. The clock voltage P5 is lowered, raising the potential of barrier 240 under gate 205, thus preventing further charge flow from diffusion 204 to diffusion 217. Clock voltage P4 is made high, forming a potential well 242 under gate 210. Clock voltage P7 is raised by an amount ΔV7; this voltage change is coupled via capacitor 214 and wire 207 to diffusions 216 and 217, causing their potentials to be lowered. Clock voltage P6 is raised to the level which P5 had at t0, lowering barrier 238 under gate 209 to the same potential that barrier 240 under gate 205 had at t0. A path now exists for charge to flow from diffusion 208 over barrier 238 to well 242 under gate 210, but the reduced diffusion potential due to the change in P7 prevents such flow.

Referring now to FIG. 8C, at time t2 clock voltage P2 is ramped to a lower voltage. This action raises the well potential under gates 202 and 212, and consequently the potential of charge packets 221 and 222, allowing them to flow over the barriers 232, 236 at gates 203 and 213 respectively. Charge packet 222 flows into the next storage gate (not shown) as in the basic CCD description given previously. Charge packet 221 flows onto diffusion 216 (as current 224), raising the potential of diffusion 216. Some of this current, identified as 224a, flows via wire 207 from diffusion 216 to diffusion 217, maintaining the equal potential of diffusions 216 and 217. At time t2, the potential of diffusions 216 and 217 has not yet risen enough to allow charge to flow over the barrier 238 at gate 209.

Referring now to FIG. 8D, at time t3 clock voltage P2 continues its negative ramp, causing the well potentials under gates 202 and 212 to continue to rise. Charge continues to flow over the barrier 232 at gate 203 (as current 224) and over the barrier 236 at gate 213. Due to charge added by current 224, the potential of diffusions 216 and 217 has risen high enough for charge to flow over the barrier 238 at gate 209, resulting in current 225. As at time t2, charge added to diffusion 216 by current 224 is conveyed to diffusion 217 by wire 207.

Referring now to FIG. 8E, at time t4 the negative ramp of clock voltage P2 which began at time t2 is complete. In this state, the potential under gates 202 and 212 is sufficiently high that all charge from these gates has flowed over the adjacent barriers 232, 236 (at gates 203 and 213 respectively). Charge packet 222 is held by the next storage well to the right of gate 213, which is not shown. Charge packet 221 has been fully transferred to diffusion 216. Part of it has continued on via wire 207 to diffusion 217, and part of that component has flowed (as current 225, shown at t3) over barrier 238 under gate 209 to the well under gate 210. The resulting charge packet at gate 210 is identified as 226. At t4, currents 224, 224a, and 225 have all declined to a negligible value.

As mentioned in connection with the discussion of the circuit at time t1, the potential under gate 209 is equal to the potential which existed under gate 205 at t0; this potential served to establish the potential of diffusions 216 and 217 at t0. Thus, at equilibrium, the potential of these diffusions and the voltage of wire 207 must be the same as they were at t0. For this to be true, capacitor 214 must have been charged by an amount ΔQ=C·ΔV7. This is the amount of charge subtracted in this operation. The charge packet 226 resulting under gate 210 is reduced in size from the original packet 221 by this amount ΔQ.

Referring now to FIG. 8F, at time t5 clock voltage P3 is set low and P1 is raised somewhat. As a result, barriers 230, 232, 234 and 236 under gates 201, 203, 211 and 213 respectively remain (with barriers 230 and 234 slightly lower.) Clock voltage P2 is set high, forming (empty) wells under gates 202 and 212. Clock voltage P6 is set low, raising the potential of barrier 238 under gate 209. Clock voltage P5 is raised, lowering the potential of barrier 240 under gate 205 to its original value at t0. No current flows from diffusion 216 because it is already at equilibrium with this potential.

Referring now to FIG. 8G, at time t6, clock voltages P4 and P7 are ramped negative. The negative ramp of P4 results in positive ramps in potentials under gate 210 and the gate preceding gate 201 (not shown). This potential rise allows charge packet 226 to flow from gate 210 over the barrier 234 under gate 211 into the well under gate 212. This flow is identified as current 229. Charge from the CCD well to the left of gate 201 flows over the barrier 230 at gate 201 into the well under gate 202 as current 227. Current flows 227 and 229 constitute normal CCD-type charge transfers, as described in conjunction with FIG. 2.

Also at time t6, clock voltage P7 is ramped negative. This negative ramp causes a negative change in the voltage of wire 207, with a corresponding positive ramp in the potential of diffusions 216 and 217. This potential rise allows charge to flow as current 228 from diffusion 216, over the barrier 240 at gate 205, to the drain diffusion 217. In order to maintain diffusion 217 at the same potential as diffusion 216, current 228a also flows via wire 207 from diffusion 217 to diffusion 216. Currents 228 and 228a constitute the disposal of the charge ΔQ which was earlier subtracted from charge packet 221 (resulting in packet 126).

At the conclusion of the voltage ramps described at t6, all voltages have returned exactly to the state shown at t0. Charge packet 226 now resides in the potential well under gate 212 (where packet 222 was located at t0). Thus, the overall effects of the device's operation through a full cycle are, first, to shift a charge packet from gate 202 to gate 212, and, second, to subtract an amount of charge ΔQ=C·ΔV7 from it. In successive operating cycles, each charge packet passing through the device is similarly processed.

Figure 9:
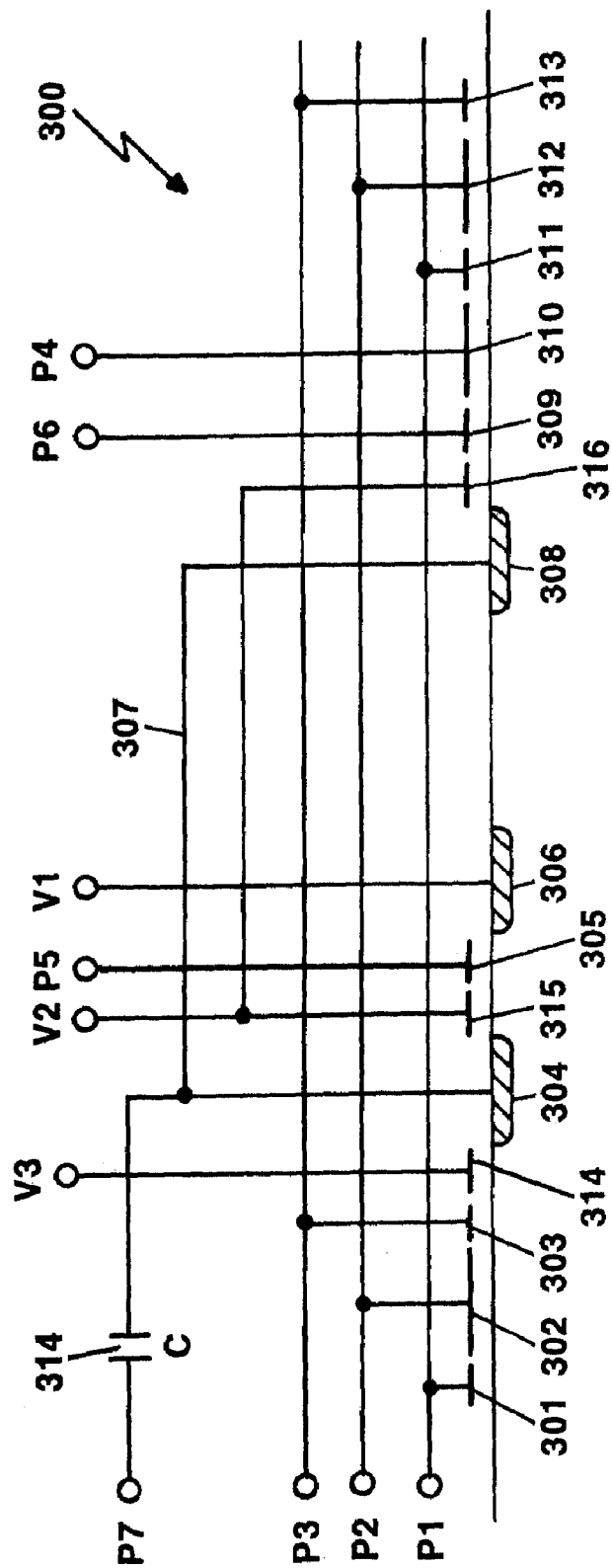
FIG. 9 is a schematic diagram of a charge subtraction device having a Faraday shield.

Referring now to FIG. 9, a charge-subtraction device 300 includes barrier gates 301, 303, 305, 309, 311 and 313; storage gates 302, 310 and 312; and diffused regions 304, 306 and 308. The drawing conventions used in FIG. 9 are the same as those used in FIGS. 1, 4 and 7.

The device 300 also includes a capacitor 314 (not part of the CCD itself); and a path 307 which couples diffused regions 304 and 308. Path 307 may be comprised of metal or other material capable of providing an ohmic contact between the two diffused regions 304 and 308. It is sometime referred to herein as a "wire."

Diffused regions 304, 306, and 308 (or more simply "diffusions") are regions of opposite conductivity type to the device substrate, similar to the source/drain diffusions of ordinary MOSFETs. As mentioned above, a diffusion can be regarded as a source or sink for charge, having essentially unlimited quantities of charge carriers available. The potential of charge in the diffusion is related to the electrical voltage of an electrode connected to the diffusion, and may be set by external connection or by charge flows within a CCD. With electrons as charge carriers, a more positive electrode voltage corresponds to a more negative diffusion potential. Note that because of the connection through wire 307, the potential of diffusions 304 and 308 are always equal. Any tendency towards imbalance is corrected by current flow through wire 307.

Gates 301, 302, 303, and 310 comprise the four gates of an ordinary four-phase CCD stage, as described with reference to FIG. 1. These gates are driven by clock voltages P1, P2, P3, and P4 respectively. It should be noted, however, that whereas in a conventional CCD gates 303 and 310 would be adjacent, in the present circuit there are additional structures disposed between them. Gates 311, 312, and 313 constitute the first three gates of an ordinary CCD stage (which continues to the right of the diagram), with the same clock voltages as gates 301, 302, and 303. Additional CCD stages are assumed to continue to the right and left of the region illustrated in FIG. 9. Barrier gate 305 is clocked by voltage P5, and barrier gate 309 is clocked by voltage P6. The capacitor 314 is driven by clock voltage P7.

The charge subtraction device 300 further includes Faraday shields provided from gate 314, biased at static voltage V3, and gates 315, and 316 biased at static voltage V2. These added gates serve as Faraday shields between the clocked gates and diffusions 304 and 308. This shielding reduces capacitive coupling from clocks to the diffusions, thereby improving accuracy of the device.

All clock voltages for this embodiment are as shown in FIG. 6. Bias voltage V1 is the same as shown in FIGS. 4 and 5A–5G.

Referring now to FIGS. 10–10G, the schematic device representation from FIG. 9 is repeated as FIG. 10. Potentials and currents are shown in FIG. 10–10G. The operation of the device 300 is similar to that of device 100 shown in FIG. 4, except that the potential to which diffusions 304 and 308 equilibrates is set by the static bias V2 rather than by the high voltage applied to terminals P5 and P6 respectively. In this embodiment, the voltages applied to terminals P5 and P6 serve only to control barriers.

In each of the charge-subtraction devices described above in conjunction with FIGS. 1–5G, the charge subtracted in each full cycle of the disclosed device is $\Delta Q = C \cdot \Delta V_7$, wherein $\Delta V_7$ is the change in voltage $V_7$ between t0 and t1 (V7 undergoes the opposite change, $-\Delta V_7$, between t5 and the next t0). When this voltage change is constant, then the subtracted charge $\Delta Q$ is constant for successive packets as well. The result is the removal of a fixed amount of charge from all packets in a signal sequence. Charge subtraction is of interest, for example, for the removal of a portion of the 'background charge' when the signal charges of interest are only a fraction of the total packet size. For signals represented as differential charge packets (as described below), this constant subtraction would remove part of the common-mode charge.

The amount of such charge to be removed or added (proportional to $\Delta V_7$) can be determined in various ways, including adjustment by feedback or feed-forward reference to the charge-packet stream itself This control signal can be applied to either the high level, the low level, or both levels of $V_7$.

In some other applications, the charge to be subtracted or added may be a time-varying quantity representing a second signal. Such a signal can be applied to either the high or low level (or both) of $V_7$, as long as $\Delta V_7$ is appropriately controlled.

Referring now to FIGS. 10A–10G, potentials and charge quantities under each gate shown in the device 300 of FIG. 9 and potentials of the three diffusions, at the seven successive instants of time t0–t6 (identified in FIGS. 6A–6G) are shown. The drawing conventions used in this figure are the same as conventions used in FIG. 2. As will be seen, the overall effect of one full cycle of operation of the device 300 (FIG. 9) is to shift a charge packet from left to right in the figure (starting at gate 302 and ending at gate 312) while subtracting a defined quantity of charge from it.

Referring first to FIG. 10A, initially, at time t0, clock voltage applied to terminal P2 (FIG. 9) is high, forming potential wells 321, 328 under gates 302 and 312 respectively. The clock voltages applied to terminals P1 (FIG. 9) and P3 (FIG. 9) of the device 300 are low, forming barriers 330, 332, 334, 336 under gates 301, 303, 311, and 313 respectively. The clock voltage applied to terminal P1 is slightly higher than the voltage applied to terminal P2, so the barriers 330, 334 under gates 301 and 311 are slightly lower than barriers 332, 336 under gates 303 and 313. The clock voltage applied to terminal P6 (FIG. 7) is low, forming a barrier 338 under gate 309. The clock voltage applied to terminal P4 (FIG. 7) is low, making storage gate 310 unattractive to charge. Charge packets 321 and 322 are held in potential wells 326 and 328 under storage gates 302 and 312 respectively, isolated by the barriers 330, 332, 334, 336 under gates 301, 303, 311, and 313. Packet 321 is an input charge to the device, and packet 322 is an output charge (from the previous subtraction operation). The clock voltage applied to terminal P5 (FIG. 9) is moderately high, forming a low barrier 340 under gate 305. The clock voltage applied to terminal P6 is low, forming a barrier under gate 309.

The potential of diffusions 304 and 308 has been established by allowing charge from diffusion 304 to flow over barrier 340 under gate 305 to diffusion 306, which acts as a drain. This flow is identified as current 323. Because of their connection via wire 307, diffusions 304 and 306 are at the same potential. At time t0, current flow 323 has declined to a negligible value, and the potential of diffusions 304 and 306 has settled to equilibrium with the potential of barrier 340 under gate 305, which is set by the clock voltage provided to terminal P5.

Referring now to FIG. 10B, at time t1 clock voltage P2 is lowered, making the barriers 330, 334 at gates 301 and 311 higher, and clock voltage P3 is raised, making the barriers 332, 336 at gates 303 and 313 somewhat lower. All four barrier potentials remain high enough to confine charge packets 321 and 322 in their respective wells. The clock voltage P5 is lowered, raising the potential of barrier 340 under gate 305, thus preventing further charge flow from diffusion 304 to diffusion 317. Clock voltage P4 is made high, forming a potential well 342 under gate 310. Clock voltage P7 is raised by an amount $\Delta V7$; this voltage change is coupled via capacitor 314 and wire 307 to diffusions 304 and 306, causing their potentials to be lowered. Clock voltage P6 is raised to the level which P5 had at t0, lowering barrier 338 under gate 309 to the same potential that barrier 340 under gate 305 had at t0. A path now exists for charge to flow from diffusion 308 over barrier 338 to well 342 under gate 310, but the reduced diffusion potential due to the change in P7 prevents such flow.

Referring now to FIG. 10C, at time t2 clock voltage P2 is ramped to a lower voltage. This action raises the well potential under gates 302 and 312, and consequently the potential of charge packets 321 and 322, allowing them to flow over the barriers 332, 336 at gates 303 and 313 respectively. Charge packet 322 flows into the next storage gate (not shown) as in the basic CCD description given previously. Charge packet 321 flows onto diffusion 304 (as current 324), raising the potential of diffusion 304. Some of this current, identified as 324a, flows via wire 307 from diffusion 304 to diffusion 306, maintaining the equal potential of diffusions 304 and 306. At time t2, the potential of diffusions 304 and 306 has not yet risen enough to allow charge to flow over the barrier 338 at gate 309.

Referring now to FIG. 10D, at time t3 clock voltage P2 continues its negative ramp, causing the well potentials under gates 302 and 312 to continue to rise. Charge continues to flow over the barrier 332 at gate 303 (as current 324) and over the barrier 336 at gate 313. Due to charge added by current 324, the potential of diffusions 304 and 306 has risen high enough for charge to flow over the barrier 338 at gate 309, resulting in current 325. As at time t2, charge added to diffusion 304 by current 324 is conveyed to diffusion 306 by wire 307.

Referring now to FIG. 10E, at time t4 the negative ramp of clock voltage P2 which began at time t2 is complete. In this state, the potential under gates 302 and 312 is sufficiently high that all charge from these gates has flowed over the adjacent barriers 332, 336 (at gates 303 and 313 respectively). Charge packet 322 is held by the next storage well to the right of gate 313, which is not shown. Charge packet 321 has been fully transferred to diffusion 304. Part of it has continued on via wire 307 to diffusion 308, and part of that component has flowed (as current 325, shown at t3) over barrier 338 under gate 309 to the well under gate 310. The resulting charge packet at gate 310 is identified as 326. At t4, currents 324, 324a, and 325 have all declined to a negligible value.

As mentioned in connection with the discussion of the circuit at time t1, the potential under gate 309 is equal to the potential which existed under gate 305 at t0; this potential served to establish the potential of diffusions 304 and 308 at t0. Thus, at equilibrium, the potential of these diffusions and the voltage of wire 307 must be the same as they were at t0. For this to be true, capacitor 314 must have been charged by an amount $\Delta Q = C \cdot \Delta V7$. This is the amount of charge subtracted in this operation. The charge packet 326 resulting under gate 310 is reduced in size from the original packet 321 by this amount $\Delta Q$.

Referring now to FIG. 10F, at time t5 clock voltage P3 is set low and P1 is raised somewhat. As a result, barriers 330, 332, 334 and 336 under gates 301, 303, 311 and 313 respectively remain (with barriers 330 and 334 slightly lower.) Clock voltage P2 is set high, forming (empty) wells under gates 302 and 312. Clock voltage P6 is set low, raising the potential of barrier 338 under gate 309. Clock voltage P5 is raised, lowering the potential of barrier 340 under gate 305 to its original value at t0. No current flows from diffusion 304 because it is already at equilibrium with this potential.

Referring now to FIG. 10G, at time t6, clock voltages P4 and P7 are ramped negative. The negative ramp of P4 results in positive ramps in potentials under gate 310 and the gate preceding gate 301 (not shown). This potential rise allows charge packet 326 to flow from gate 310 over the barrier 334 under gate 311 into the well under gate 312. This flow is identified as current 329. Charge from the CCD well to the left of gate 301 flows over the barrier 330 at gate 301 into the well under gate 302 as current 327. Current flows 327 and 329 constitute normal CCD-type charge transfers, as described in conjunction with FIG. 2.

Also at time t6, clock voltage P7 is ramped negative. This negative ramp causes a negative change in the voltage of wire 307, with a corresponding positive ramp in the potential of diffusions 304 and 308. This potential rise allows charge to flow as current 328 from diffusion 304, over the barrier 340 at gate 305, to the drain diffusion 306. In order to maintain diffusion 308 at the same potential as diffusion 304, current 328a also flows via wire 307 from diffusion 308 to diffusion 304. Currents 328 and 328a constitute the disposal of the charge $\Delta Q$ which was earlier subtracted from charge packet 321 (resulting in packet 326).

At the conclusion of the voltage ramps described at t6, all voltages have returned exactly to the state shown at t0. Charge packet 326 now resides in the potential well under gate 312 (where packet 322 was located at t0). Thus, the overall effects of the device's operation through a full cycle are, first, to shift a charge packet from gate 302 to gate 312, and, second, to subtract an amount of charge $\Delta Q = C \cdot \Delta V7$ from it. In successive operating cycles, each charge packet passing through the device is similarly processed.

It should be noted that the circuit described above in conjunction with FIG. 9 can be considered as the circuit of FIG. 4 with the addition of Faraday shields. Thus, it should be appreciated that Faraday shields can be similarly added to the circuit embodiment described above in conjunction with FIG. 7.

The detailed description of this invention given above is based upon a single stream of signal charge packets. In many applications, paired charge packets are used: the signal is represented as the charge difference between the members of a pair of charge packets (this method allows, for example, the representation of signed signal values.) If the charge-packet pair is carried sequentially in a single CCD register, then the method disclosed here is directly applicable: by repeating $\Delta V_7$, the same $\Delta Q$ is removed from (or added to) each member of the pair. If the charge-packet pair is carried in a parallel pair of CCD registers, then the method disclosed here can also be used. The device structure shown in FIG. 4 is duplicated, with one copy for each of the two CCD registers. V7 is applied to the two registers via two capacitors equivalent to capacitor 114. If the capacitors are equal then the subtracted or added charges $\Delta Q$ will also be equal.

Note that the representations of device elements, charges and potentials in FIGS. 1–10 are in a conventional form familiar to persons accustomed to designing with CCDs. Note also that, although these figures and the accompanying explanations assume a surface-channel, N-channel CCD, the invention is equally applicable to other CCD types. Such other types include buried-channel CCDs, CCDs with other gate designs such as overlapping gates, P-channel CCDs and Schottky-barrier CCDs. More complex gate sequences, such as cascode designs, may also be used with this invention. In addition, other clocking schemes than the one shown can be used with this invention.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A device for modifying a first amount of charge traversing a charge-coupled device (CCD) comprising:
   a plurality of CCD gates, at least some of said plurality of CCD gates adapted to be driven by periodic clock voltages;
   a first diffused region disposed between first and second ones of said plurality of CCD gates;
   a second diffused region disposed adjacent a third one of said plurality of CCD gates; and
   a conductive path having first and second ends with a first one of the first and second ends coupled to said first diffused region and a second one of the first and second ends coupled to said second diffused region; and
   a capacitor having a first lead and a second lead, with a first one of the first and second leads coupled to said conductive path.

2. The device of claim 1 wherein a voltage change is applied to the second lead of said capacitor and said voltage change being coupled to said conductive path through said capacitor provides a second amount of charge which modifies said first amount of charge in the CCD.

3. The device of claim 2 wherein said second amount of charge has the same sign as said first amount of charge, such that said modification of said first amount of charge constitutes addition.

4. The device of claim 2 wherein said second amount of charge has the opposite sign to said first amount of charge, such that said modification of said first amount of charge constitutes subtraction.

5. The device of claim 2 wherein the second amount of charge is a fixed value amount of charge.

6. The device of claim 2 wherein the second amount of charge is a time-varying amount of charge.

7. The device of claim 1 wherein said path corresponds to a conductive interconnect having an ohmic contact with both the first and second diffused regions.

8. The device of claim 2 wherein said first charge is transported from said first CCD gate to said first diffusion, is there combined with said second charge, and then is further transported to said second CCD gate.

9. The device of claim 2 wherein said first charge is transported from said first CCD gate to said first diffusion, is there combined with said second charge, then traverses said conductive path to said second diffusion, and then is further transported via said second CCD gate.

10. The device of claim 9 wherein the second diffusion is remote from the first diffusion.

11. The device of claim 1 further comprising a third diffused region disposed adjacent one of the first, second and third one of said gates.

12. The device of claim 11 wherein in response to a voltage change applied to the second lead of the capacitor, a second amount of charge which modifies the first amount of charge is provided and wherein the first amount of charge moves from the first gate to the first diffusion where the first and second amount of charge merge resulting in a modified charge which moves to the second gate.

13. The device of claim 1 wherein said CCD is provided as one of:
   a surface-channel CCD;
   a buried-channel CCD; and
   a Schottky-barrier CCD.

14. A charge-coupled device (CCD) comprising:
   a substrate;
   a first barrier gate disposed along a top surface of said substrate;
   a first storage gate disposed adjacent said first barrier gate;
   a second barrier gate disposed adjacent said first storage gate;
   a first diffusion disposed adjacent said second barrier gate;
   a third barrier gate disposed adjacent said first diffusion;
   a second diffusion disposed remotely from said first diffusion;
   a fourth barrier gate disposed adjacent said second diffusion;
   a second storage gate disposed adjacent said fourth barrier gate;
   a fifth barrier gate disposed adjacent said second storage gate;
   a first clock voltage coupled to said first barrier gate and said fifth barrier gate;
   a second clock voltage coupled to said first storage gate;
   a third clock voltage coupled to said second barrier gate;
   a fourth clock voltage coupled to said third barrier gate;
   a fifth clock voltage coupled to said fourth barrier gate;
   a sixth clock voltage coupled to said second storage gate;
   a conductive interconnect connecting said first diffusion and said second diffusion;
   a capacitor having a first lead and a second lead, wherein the second lead is coupled to said conductive interconnect; and
   a voltage change coupled to the first lead of said capacitor, wherein the voltage change coupled through said capacitor provides a second amount of charge to modify a first amount of charge of a packet traversing the CCD.

15. The device of claim 14 wherein the second amount of charge is combined with the first amount of charge as said first amount of charge moves from said first storage gate to said second storage gate.

16. The device of claim 14 wherein the second amount of charge is combined with the first amount of charge as said first amount of charge moves from said second storage gate to said first storage gate.

17. The device of claim 14 wherein said second amount of charge has the same sign as said first amount of charge, such that said modification of said first amount of charge constitutes addition.

18. The device of claim 14 wherein said second amount of charge has the opposite sign to said first amount of charge, such that said modification of said first amount of charge constitutes subtraction.

19. The device of claim 14 wherein said second amount of charge is a fixed value amount of charge.

20. The device of claim 14 wherein said second amount of charge is a time-varying amount of charge.

21. The device of claim 14 wherein said CCD is provided as one of:
   a surface-channel CCD;
   a buried-channel CCD; and
   a Schottky-barrier CCD.

22. The device of claim 14 further comprising a third diffusion adjacent said third barrier gate and a seventh voltage coupled to said third diffusion.

23. The device of claim 14 further comprising a third storage gate disposed adjacent said fifth barrier gate and wherein said second voltage is coupled to said third storage gate.

24. The device of claim 23 further comprising a sixth barrier gate disposed adjacent said third storage gate, and wherein said third voltage is coupled to said sixth barrier gate.

25. A device for modifying a first amount of charge traversing a charge-coupled device (CCD), the device comprising:
- a plurality of CCD gates, at least some of said plurality of CCD gates adapted to be driven by periodic clock voltages;
- a first one of said plurality of CCD gates adapted to be biased to a first fixed voltage;
- a second one of said plurality of CCD gates adapted to be biased to a second fixed voltage;
- a first diffused region disposed between and adjacent to said first and second CCD gates;
- a second diffused region;
- a third CCD gate adapted to be biased to a third fixed voltage, said third CCD gate disposed between one of said plurality of CCD gates corresponding to a first clock gate and said second diffused region;
- a conductive path having first and second ends with a first one of the first and second ends coupled to said first diffused region and a second one of the first and second ends coupled to said second diffused region; and
- a capacitor having a first lead and a second lead, with a first one of the first and second leads coupled to said conductive path.

26. The device of claim 25 wherein a voltage change is applied to the second lead of said capacitor and said voltage change being coupled to said conductive path through said capacitor provides a second amount of charge which modifies said first amount of charge in the CCD.

27. The device of claim 26 wherein said second amount of charge has the same sign as said first amount of charge, such that said modification of said first amount of charge constitutes addition.

28. The device of claim 26 wherein said second amount of charge has the opposite sign to said first amount of charge, such that said modification of said first amount of charge constitutes subtraction.

29. The device of claim 26 wherein the second amount of charge is a fixed value amount of charge.

30. The device of claim 26 wherein the second amount of charge is a time-varying amount of charge.

31. The device of claim 25 wherein said conductive path corresponds to a conductive interconnect having an ohmic contact with both the first and second diffused regions.

32. The device of claim 25 further comprising a third diffused region and wherein one of said plurality of CCD gates corresponds to a clocked gate and is disposed adjacent one of the first and second gates and adjacent said third diffused region.

33. The device of claim 32 wherein the modified charge traverses said conductive path to the second diffusion, and then to the third gate.

34. The device of claim 25 wherein the second diffusion is remote from the first diffusion.

35. The device of claim 25 further comprising a third diffused region disposed adjacent the first clock gate.

36. The device of claim 35 wherein in response to a voltage change applied to the second lead of the capacitor, a second amount of charge which modifies the first amount of charge is provided and wherein the first amount of charge moves from the first gate to the first diffusion where the first and second amount of charge merge resulting in a modified charge which moves to the second gate.

37. The device of claim 25 wherein said CCD is provided as one of:
- a surface-channel CCD;
- a buried-channel CCD; and
- a Schottky-barrier CCD.

* * * * *

UNITED STATES PATENT AND TRADEMARK OFFICE
CERTIFICATE OF CORRECTION

PATENT NO. : 7,199,409 B2
APPLICATION NO. : 10/926937
DATED : April 3, 2007
INVENTOR(S) : Anthony It is certified that error appears in the above-identified patent and that said Letters Patent is hereby corrected as shown below:

Column 2, line 58 delete "discussion it" and replace with --discussion, it--.

Column 2, line 66 delete "long heavy" and replace with --long, heavy--.

Column 2, line 67 delete "shorter heavy" and replace with --shorter, heavy--.

Column 3, line 19 delete "diagrams the" and replace with --diagrams, the--.

Column 4, line 16 delete "111 and 12" and replace with --11 and 12--.

Column 4, line 23 delete "enough the" and replace with --enough, the--.

Column 4, line 61 delete "sometime" and replace with --sometimes--.

Column 5, line 15 delete "CCD gates" and replace with --CCD, gates--.

Column 6, line 22 delete ", at time t1 clock" and replace with --, at time t1, clock--.

Column 6, line 41 delete ", at time t2 clock" and replace with --, at time t2, clock--.

Column 6, line 55 delete ", at time t3 clock" and replace with --, at time t3, clock--.

Column 6, line 65 delete ", at time t4 clock" and replace with --, at time t4, clock--.

Column 7, line 23 delete ", at time t5 clock" and replace with --, at time t5, clock--.

Column 8, line 11 delete "For example gate 201" and replace with --For example, gate 201--.

Column 9, line 13 delete ", at time t1 clock" and replace with --, at time t1, clock--.

Column 9, line 32 delete ", at time t2 clock" and replace with --, at time t2, clock--.

Column 9, line 46 delete ", at time t3 clock" and replace with --, at time t3, clock--.

Column 9, line 57 delete ", at time t4 clock" and replace with --, at time t4, clock--.

Column 10, line 15 delete ", at time t5 clock" and replace with --, at time t5, clock--.

UNITED STATES PATENT AND TRADEMARK OFFICE
CERTIFICATE OF CORRECTION

PATENT NO.         : 7,199,409 B2
APPLICATION NO. : 10/926937
DATED                 : April 3, 2007
INVENTOR(S)       : Anthony It is certified that error appears in the above-identified patent and that said Letters Patent is hereby corrected as shown below:

Column 10, line 66-67 delete "sometime" and replace with --sometimes--.

Column 11, line 20 delete "CCD gates 303 and 310" and replace with --CCD, gates 303 and 310--.

Column 11, line 43 delete "FIG. 10-10G." and replace with --FIGS. 10-10G--.

Column 12, line 1 delete "itself This" and replace with --itself. This--.

Column 12, line 51 delete ", at time t1 clock" and replace with --, at time t1, clock--.

Column 13, line 3 delete ", at time t2 clock" and replace with --, at time t2, clock--.

Column 13, line 17 delete ", at time t3 clock" and replace with --, at time t3, clock--.

Column 13, line 27 delete ", at time t4 clock" and replace with --, at time t4, clock--.

Column 13, line 52 delete ", at time t5 clock" and replace with --, at time t5, clock--.

Column 14, line 24 delete "$\Delta Q = C\Delta V7$" and replace with --$\Delta Q = C \cdot \Delta V7$--.

Column 14, lines 48-49 delete "equal then" and replace with --equal, then--.

Column 14, lines 62-63 delete "invention it" and replace with --invention, it--.

UNITED STATES PATENT AND TRADEMARK OFFICE
CERTIFICATE OF CORRECTION

PATENT NO. : 7,199,409 B2
APPLICATION NO. : 10/926937
DATED : April 3, 2007
INVENTOR(S) : Anthony It is certified that error appears in the above-identified patent and that said Letters Patent is hereby corrected as shown below:

Column 14, line 65 delete "submitted that that the" and replace with --submitted that the--.

Signed and Sealed this

Twenty Second Day of April, 2008

JON W. DUDAS
*Director of the United States Patent and Trademark Office*